INVENTOR
ANDREW K. ANANDER

Nov. 26, 1957  A. K. ANANDER  2,814,233
FLEXIBLE SHEET SUPPORT FOR PHOTOGRAPHIC DEVICE
Filed Aug. 27, 1956  2 Sheets-Sheet 2
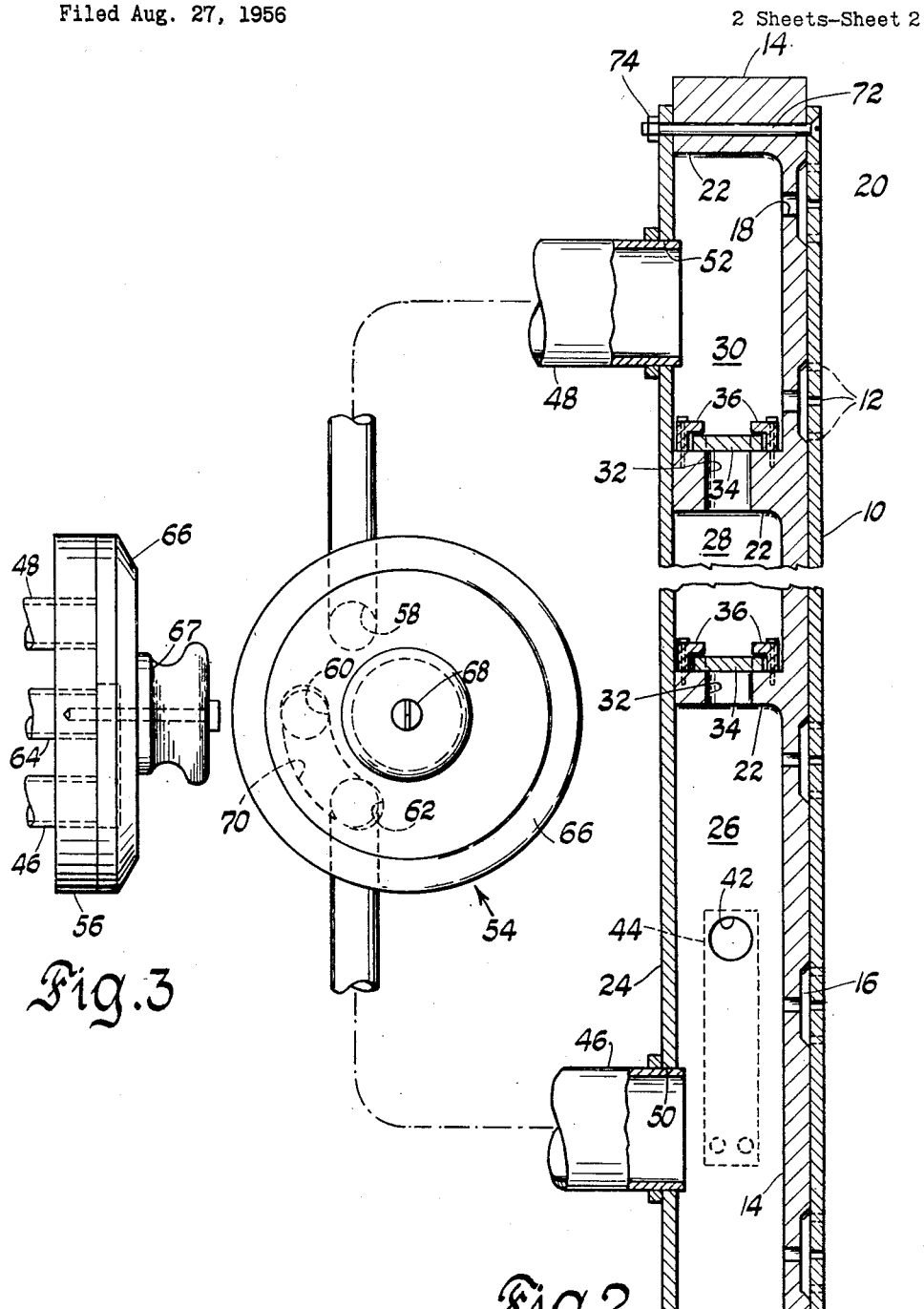
INVENTOR
ANDREW K. ANANDER
BY
ATTORNEYS United States Patent Office
2,814,233
Patented Nov. 26, 1957

2,814,233

FLEXIBLE SHEET SUPPORT FOR PHOTOGRAPHIC DEVICE

Andrew K. Anander, Glen Cove, N. Y., assignor to Powers Chemco, Inc., Glen Cove, N. Y., a corporation of New York Application August 27, 1956, Serial No. 606,467

6 Claims. (Cl. 88—24)

This invention relates to a film support for use with large photographic cameras and has specific relation to an improved support forming part of such a camera and wherein a sheet of photosensitive paper is held in firm and intimate contact with the support by means of suction.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawing:

Figure 2 is a partial vertical section of the support of Figure 1 taken generally along line 2—2 of this figure with the scale of Figure 2 being much larger than that of Figure 1.

Figure 3 is a side view of the rotary valve shown in plan in Figure 2.

Figure 1:
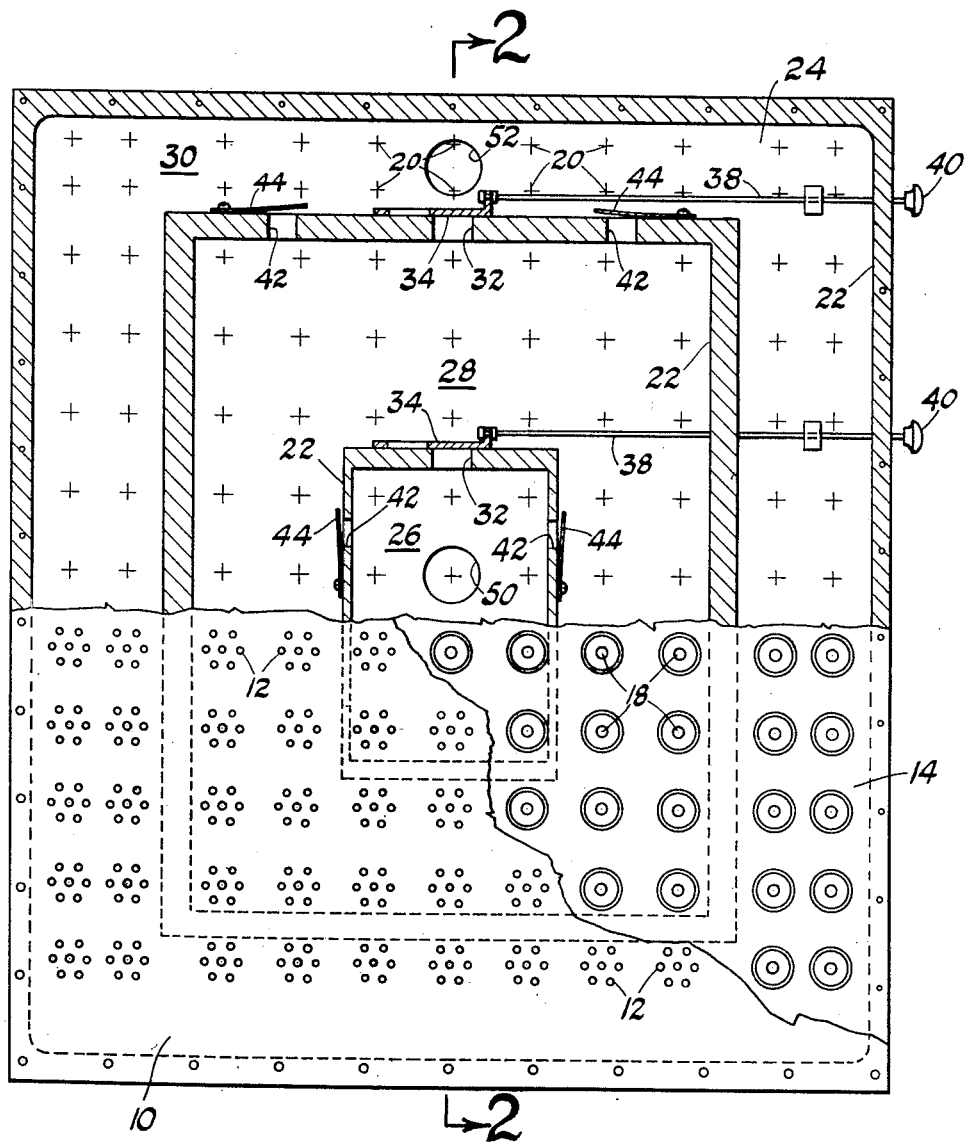
Figure 1 is a front plan view of a preferred embodiment of the improved support of this invention with parts being broken away to better show the details of construction.

In certain photographic work precision requires that the support for the photosensitive paper, whether the support be a camera back, easel, copy board for enlargers or other support, be of the vacuum type wherein this paper is firmly held by suction against the support insuring flatness of the sheet. In accordance with the present invention there is provided such a support of improved construction.

The present invention has for its object the provision of an improved support for the flexible sheet of photosensitive paper in a photographic camera wherein the paper is held in contact with the support by means of suction. A further object is to provide an improved support of this type wherein suction is applied to openings distributed over the face of the support through a manifolding arrangement by means of which suction may be applied to the entire area of the support or limited to centrally located portions thereof. A further object of the invention is to provide such a suction type film support which is vertically disposed and wherein the manifold through which suction is applied to the openings in the face is constructed and arranged so that when roll film is used suction may be applied to the entire area of the support with an increased suction effect being had at the upper central portion of the support while when cut film is used suction may be restricted to central areas of the support which correspond generally to the film size. A still further object of the invention is to provide such a suction type support with a manifold of nested chambers overlying and covering the rear of the support and arranged so that when suction is applied directly to the outermost chamber all of the chambers automatically have suction applied to them while when suction is applied directly to the centralmost chamber the number of chambers to which suction is applied outwardly of the central chamber may be controlled as desired. Another object of the invention is to provide such a suction type film support that may be used to advantage with either cut film to prevent excessive suction loss or roll film to apply the suction in a way that tends to insure that the film is flat against the support with the operation of the support for either of these film types being simple and rapid and with the support being extremely rugged yet simple and economical to manufacture.

In accordance with the present invention there is provided a facing member which has openings distributed throughout its area and through which suction is applied to a sheet of photosensitive paper that is positioned against the flat front face of this member. Overlying and in engagement with the rear face of this member is a backing plate which has passages extending therethrough and each of which communicates only with a particular group of openings in the facing member. This backing plate is provided with a series of rearwardly extending ribs or partitions, which, together with a plate overlying the rear face of this backing member, form a plurality of separate chambers with one chamber being located generally centrally with respect to the facing member and effectively covering a restricted central area of the facing member and with the other chambers positioned about and progressively outward of this central chamber with these several chambers together covering substantially the entire area of the backing plate and accordingly the facing member. These chambers form a manifold for the application of suction to the openings of the facing member through the passages in the backing member and conduits are connected directly with the central chamber and the upper central portion of the outermost chamber in order to connect these chambers directly with a source of vacuum and a suitable valve may be provided to control the application of suction through one or the other of these conduits.

Communication between the several chambers of the manifold is provided through a valved connection between each pair of adjacent chambers with these valves being manually operable so that they may be positioned and retained in either the open or closed position as desired. When cut film is used suction is applied through the connection to the centermost chamber and these valves are adjusted so that the effective area of the facing member to which suction is applied is the smallest obtainable which will completely cover the film sheet being used. When roll type film is employed suction is applied through the connection with the outermost chamber which connection is located in the upper central portion of this chamber. The passages in the backing member adjacent the location of the application of this suction are enlarged with relation to the other passages in the backing member so that an increased suction effect is produced through the corresponding openings in the facing member with this being desirable when roll film is employed in order to better hold the film, with these enlarged holes having been found from experience to be desirable and advantageous. Suction thus applied to the outermost chamber of the manifold is also applied to the successive inner chambers through passages in the walls of the various chambers with which are associated check valves that prevent flow from an outer to an inner chamber while permitting flow in the opposite direction. Thus when suction is applied to the outermost chamber all of the chambers have suction applied thereto without the necessity of actuating the manually operable valves.

It will be understood that the foregoing general description and the following detailed description as well are exemplary and explanatory of the invention but are not restrictive thereof.

Referring now in detail to the drawings, wherein like reference characters are used throughout to designate like elements, the illustrative and preferred embodiment of the invention depicted therein comprises a facing plate 10 having a flat outer surface and being provided with groups of openings 12 distributed uniformly throughout the area of the plate. The flat outer surface of plate 10 is adapted to have a sheet of photosensitive material placed over and in engagement therewith with the paper, film or other photosensitive material being held in firm contact with the face of the plate by the application of suction through the groups of openings 12. Overlying the back of plate 10 and in engagement therewith is the backing plate 14 which is cemented to plate 10 about the overlying edge of the two plates in a fluid tight manner. The face of plate 14 that is in engagement with facing plate 10 is provided with relieved portions or recesses 16 each of which communicates directly with and encompasses one of the group of openings 12 provided in facing plate 10 with bores or passages 18 extending from the bottom of these relieved portions through the backing plate. In the upper portion of Figure 1 the face of backing plate 14 and through which bores 18 extend has been broken away but the small crosses represent the location of these bores and for a purpose that is later described these bores 18 at the uppermost central portion of the backing plate, as for example the bores that would be located at the six locations designated by the numeral 20 in Figure 1, are substantially larger than the remainder of these bores in the backing plate.

Suction is applied to bores 18 through a suitable manifold located at the rear of backing plate 14 and to form this manifold partitions 22 are provided which extend laterally from and rearwardly of the backing plate and in overlying relation with which is cover plate 24. The partitions or ribs 22 are disposed as shown in Figure 1 so that with cover plate 24, which preferably engages the partitions in a fluid tight manner, three separate chambers 26, 28 and 30 are provided with chamber 26 preferably being located centrally with respect to backing plate 14 and facing plate 10 and being of rectangular shape while chambers 28 and 30 are disposed about this central chamber 26 and respectively progressively outward thereof. These nested chambers thus, in combination, cover the entire area of backing plate 14 except for the area that is occupied by partitions 22. Extending through partitions 22 between chambers 26 and 28 and between chambers 28 and 30 are passages 32 with which are associated the manually operated valves 34 which may conveniently take the form of slide valves resting on the upper surface of the partitions and positioned between suitable guide members 36. Actuation of each of these valves to and from open and closed positions may be had through the actuating rod 38 which is connected at one end to the valve and extends in a horizontal direction through partitions 22 to the exterior of the film support being provided at its outer end with handle 40 permitting the valves to be readily adjusted to their desired position.

Communication between adjacent chambers is also had through the passages 42 which extend through partitions 22 as shown. Fluid flow through these passages 42 is restricted to the direction from an inner to an outer chamber, i. e. from chamber 26 to 28 and from chamber 28 to chamber 30, by check valves 44 which are disclosed as and may preferably take the form of a leaf spring type of valve normally occupying a closed position with respect to its associated passage 42, but being drawn into an open position by fluid flow in the direction from an inner toward an outer chamber.

Suction is applied to the manifold through conduit 46 or 48 with conduit 46 extending through opening 50 in cover plate 24 so that it communicates directly with the innermost chamber 26, while conduit 48 extends through opening 52 in this cover plate so that it communicates directly with the outermost chamber 30 with opening 52 being located at the uppermost central portion of this chamber as shown in Figure 1.

The application of suction through the conduits 46 and 48 may be controlled in any desired manner such as by manually plugging or capping one of the conduits while connecting the other to the source of suction. However, for convenient and rapid operation this control is preferably obtained through a suitable valve such as that shown in Figures 2 and 3 and designated generally 54. This valve 54 comprises stationary body 56 through which extend the arcuately spaced openings 58, 60 and 62 with openings 58 and 62 communicating with conduits 48 and 46, respectively, while opening 60 is connected through conduit 64 to a suitable source of suction such as a vacuum pump, not shown. Positioned in overlying relation and in engagement with body 56 is the rotatable member 66 which is maintained in engagement with body 56 by means of coaxial bolt or cap screw 68 which extends through a suitable bore provided in member 66 and is threaded into body 56. Communication between opening 60 and openings 58 and 62 positioned on either side thereof is established through arcuate recess 70 provided in member 66 and which is of a sufficiently accurate dimension, as shown, so that opening 60 may communicate with only one of the openings 58 or 62 at a time so that suction may not be applied to or through conduits 46 and 48 simultaneously. Rotation of member 66 is had by means of the knob 67 extending upwardly or outwardly from this member and, of course, the member may be adjusted so that opening 60 communicates with either opening 58 or 62.

The three overlying plates 10, 14 and 24 are secured together at all points of contact in a fluid tight manner by bolts 72 and a suitable cement with these bolts being countersunk into facing plate 10 and extend through aligned bores provided in the facing plate 10, backing plate 14, and cover plate 24. Threaded on the outer end of each of these bolts is a nut 74 which when tightened down securely clamps the plates together.

In operation, the support is mounted within the camera in a vertical position so that the outer face of facing plate 10 is vertically disposed and against this outer face is positioned the flexible sheet of photosensitive material which is to be supported and maintained flat by the support. When cut film is being used, i. e. film that is cut to size as distinguished from roll type film, suction is applied to the manifold through conduit 46 so that valve 54 occupies the position shown in Figures 2 and 3 with opening 60 being in communication with opening 62 so that conduit 46 is in communication with conduit 64 which leads to the source of suction. When the cut film is of a sufficiently small size so that it will lie within the bounds of central chamber 26, valve 34 is maintained in its closed position so that suction is applied only to the centermost chamber with which the conduit 46 is connected with the check valve 44 closed to prevent suction from being applied to chamber 28. When the cut film is too large to lie within the bounds of chamber 26 but sufficiently small to lie within the bounds of chamber 28 the valve 34 intermediate these two chambers is opened so that suction will be applied to both of the chambers 26 and 28 with the groups of openings 12 that communicate with the passages 18 over which these two chambers overlie accordingly having suction applied to them and with chamber 30 remaining isolated through its associated valve 34 and check valves 44. When a still larger sheet of cut film is being used so that it extends beyond the bounds of chamber 28 the other valve 34 which controls communication between chambers 28 and 30 through passage 32 is moved to its open position so that when suction is applied through conduit 46 all of the chambers are partially evacuated with suction then being applied to all of the groups of openings 12 throughout the area of facing plate 10 through the associated passages 18. Thus, with cut film, the area of facing plate 10 to which suction is applied may be regulated by manipulation of the valves 34 so that it may more nearly correspond with the size of the particular sheet of film being used at a particular time thereby decreasing the area to which suction is applied and which is not covered by film resulting in decreasing the suction loss and increasing the efficiency of operation and the intensity of the suction applied to the film. When roll type film is being employed valve 54 is positioned so that suction is applied only through conduit 48 with arcuate recess 70 establishing communication between openings 60 and 58. Since conduit 48 communicates directly with the outermost chamber 30 of the manifold and since check valves 44 permit fluid flow from an inner to an outer chamber suction is applied to all of the chambers of the manifold through the conduit 48 and therefore the entire area of facing plate 10 or more correctly all of the groups of openings 12 distributed over the facing plate have suction applied thereto when roll film is being used with this being accomplished without manipulation of and regardless of the position of valves 34. By positioning the connection of conduit 48 with chamber 30 at the uppermost central portion of this chamber the greatest suction effect or in other words the lowest pressure in the entire manifold will be obtained at this location. In addition to this the passages 18 at this location are of greater area than the remainder of the passages 18 so that the suction applied to the groups of openings 12 corresponding with this location (identified as 20 in Figure 1) is correspondingly greater than that of the other groups of openings resulting in an increased force being applied to the film at this location to hold it against the facing plate.

With the novel and improved construction of the present invention the effective area of the support to which suction is applied may be varied when cut film is being used so that this area corresponds generally with the size of the particular sheet of film, while when roll film is being employed suction may be applied through the groups of openings 12 over the entire area of the support with the suction applied to the upper centermost openings being greater than that applied to the remainder of the openings and the transformation from operation for cut film to operation for roll type film be effected merely by adjusting the single valve 54.

The invention in its broader aspects is not limited to the specific mechanisms shown and described but departures may be made therefrom, within the scope of the accompanying claims, without departing from the principles of the invention and without sacrificing its chief advantages.

What is claimed is:

1. A support for flexible sheet material such as photographic film comprising a facing member having a flat front face adapted to receive said material and provided with openings distributed thereover for the application of suction to the material placed against said flat face, manifold means at the rear of said member for applying suction to said openings, said manifold means including partitions forming a plurality of separate chambers effectively covering substantially the entire area of said facing member with said chambers being internested, a valved passageway in the partition between each pair of adjacent chambers for establishing communication therebetween, actuating means for each of these valves controllable exteriorly of the chamber, additional passageways intermediate adjacent chambers, check valves associated with said additional passageways and operative to prevent flow from an outer toward an inner chamber while permitting flow in the opposite direction, means effective to connect the innermost of said chambers directly with a source of vacuum, means effective to connect the outermost of said chambers directly with a source of vacuum and means for controlling the application of suction through each of said last two mentioned means.

2. In a photographic camera the combination of a support for a sheet of photosensitive paper comprising substantially vertical facing means provided with openings distributed over its surface, backing means overlying said facing means and forming a plurality of nested chambers which together effectively cover substantially the entire surface of the facing means and form a manifold for the application of suction to said openings, a passageway interconnecting adjacent chambers, a valve associated with each passageway to control flow therethrough, actuating means for said valves including means disposed exteriorly of said chambers, additional passageways interconnecting adjacent chambers with check valves associated therewith and operative to prevent flow from an outer to an inner chamber while permitting flow in the opposite direction, means for connecting the innermost of said chambers and the outermost of said chambers directly with a source of suction, and a valve means for controlling the application of suction through each of said last mentioned means and operative to prevent the simultaneous application of suction directly to the innermost and outermost chambers.

3. In a photographic camera the combination of a vertically disposed support for a sheet of photosensitive paper, said support having a generally vertical face against which the sheet is held and which has openings distributed over its area through which suction is applied to said sheet, means disposed at the rear of said support and effectively forming a manifold for the application of suction to said openings and which comprises a plurality of separate chambers that together overlie substantially the entire area of said support, with each chamber communicating with the portion of the support it overlies, said means including partitions that define and separate said chambers and are disposed so that one of the chambers is located generally centrally of the support with the other chambers disposed about and progressively outward from this centrally located chamber, the partitions between adjacent chambers having passageways therein for establishing communication therebetween, valves associated with these passageways operative to control fluid flow therethrough, actuating means for said valves accessible exteriorly of the chambers, additional passageways in said partitions, check valves associated with said additional passageways operative to prevent fluid flow therethrough in a direction from an outer to an inner chamber while permitting flow in the opposite direction, conduit means communicating directly with the centermost chamber for connecting the same with a source of suction, conduit means communicating directly with the outermost chamber at the central upper portion thereof and means for controlling the application of suction through these conduit means.

4. In a photographic camera the combination of a vertically disposed support for a sheet of photosensitive paper, said support having a generally vertical face against which the sheet is held and which has openings distributed over its area through which suction is applied to said sheet, means disposed at the rear of said support and effectively forming a manifold for the application of suction to said openings and which comprises a plurality of separate chambers that together overlie substantially the entire area of said support, with each chamber communicating with the portion of the support it overlies, said means including partitions that define and separate said chamber and are disposed so that one of the chambers is located generally centrally of the support with the other chambers disposed about and progressively outward from this centrally located chamber, the partitions between adjacent chambers having passageways therein for establishing communication therebetween, valves associated with these passageways operative to control fluid flow therethrough, actuating means for said valves accessible exteriorly of the chambers, additional passageways in said partitions, check valves associated with said additional passageways operative to prevent fluid flow therethrough in a direction from an outer to an inner chamber while permitting flow in the opposite direction, conduit means communicating directly with the centermost chamber for connecting the same with a source of suction, conduit means communicating directly with the outermost chamber at the central upper portion thereof, means for controlling the application of suction through these conduit means and means effective to insure that when suction is applied directly to the outermost chamber the suction effect of the uppermost and centrally located openings in the face of the support is greater than the other openings in the face.

5. In a photographic camera the combination of a vertically disposed support member for vertically supporting a flexible sheet of photosensitive paper in firm intimate contact therewith, said support member comprising a vertical facing plate provided with groups of openings distributed over its area, a backing plate overlying the back of said facing plate, said backing plate having individual relieved portions provided in its overlying face and communicating with each group of openings and having a passageway extending from each relieved portion through the plate with the passageways in the upper central portion of the plate having a greater cross section than those in the remainder of the plate, a plate overlying the other face of said backing member and forming therewith a manifold through which suction may be applied to said groups of openings through said passages and relieved portions, partitions disposed generally normal to the plane of said facing plate and dividing said manifold into a plurality of chambers one of which is generally centrally disposed with respect to the facing plate with the others disposed about and progressively outward of said central chamber and with said chambers overlying substantially the entire area of the backing plate, a passageway through the partition separating each pair of adjacent chambers, a manually operable valve associated with each passageway and operable to control fluid flow therethrough, actuating means for said valves extending exteriorly of said manifold, additional passageways extending through the partitions between adjacent chambers, check valves associated with said additional passageways and operative to restrict fluid flow therethrough to a direction from an inner to an outer chamber, conduit means communicating directly with the outermost chamber at the central upper portion thereof for applying suction thereto, conduit means communicating directly with the central chamber for applying suction thereto, and means for controlling the application of suction through each of these conduit means.

6. In a photographic camera the combination of a vertically disposed support member for vertically supporting a flexible sheet of photosensitive paper in firm intimate contact therewith, said support member comprising a vertical facing plate provided with groups of openings distributed over its area, a backing plate overlying the back of said facing plate, said backing plate having individual relieved portions provided in its overlying face and communicating with each group of openings and having a passageway extending from each relieved portion through the plate with the passageways in the upper central portion of the plate having a greater cross section than those in the remainder of the plate, a plate overlying the other face of said backing member and forming therewith a manifold through which suction may be applied to said groups of openings through said passages and relieved portions, partitions disposed generally normal to the plane of said facing plate and dividing said manifold into a plurality of chambers one of which is generally centrally disposed with respect to the facing plate with the others disposed about and progressively outward of said central chamber and with said chambers overlying substantially the entire area of the backing plate, a passageway in the upper portion of the partition separating each pair of adjacent chambers, a slide valve operative to control each such passageway and resting on the upper surface of each such partition for movement to and from valving relation with the upper end of the respective passageway, an actuating rod extending from each valve generally horizontally to exterior of the manifold, additional passageways extending through the partitions separating adjacent chambers, spring leaf, normally closed check valves overlying said additional passageways and operative to restrict flow therethrough to a direction from an inner to an outer chamber, conduit means communicating directly with the outermost chamber at the central upper portion thereof and with the central chamber for applying suction thereto, and valve means operative to prevent simultaneous application of suction through the conduit means communicating directly with each of these chambers and restrict said application through the conduit means to only one of these chambers at a time.

No references cited.